July 30, 1968  A. L. ROBERTS  3,394,535
APPARATUS AND METHOD OF HARVESTING AND PROCESSING SUGAR
CANE AND SIMILAR STALKED CROPS
Filed Feb. 25, 1965  11 Sheets-Sheet 2

INVENTOR.
ALFRED L. ROBERTS
BY
ATTORNEY

INVENTOR.
ALFRED L. ROBERTS
BY
ATTORNEY

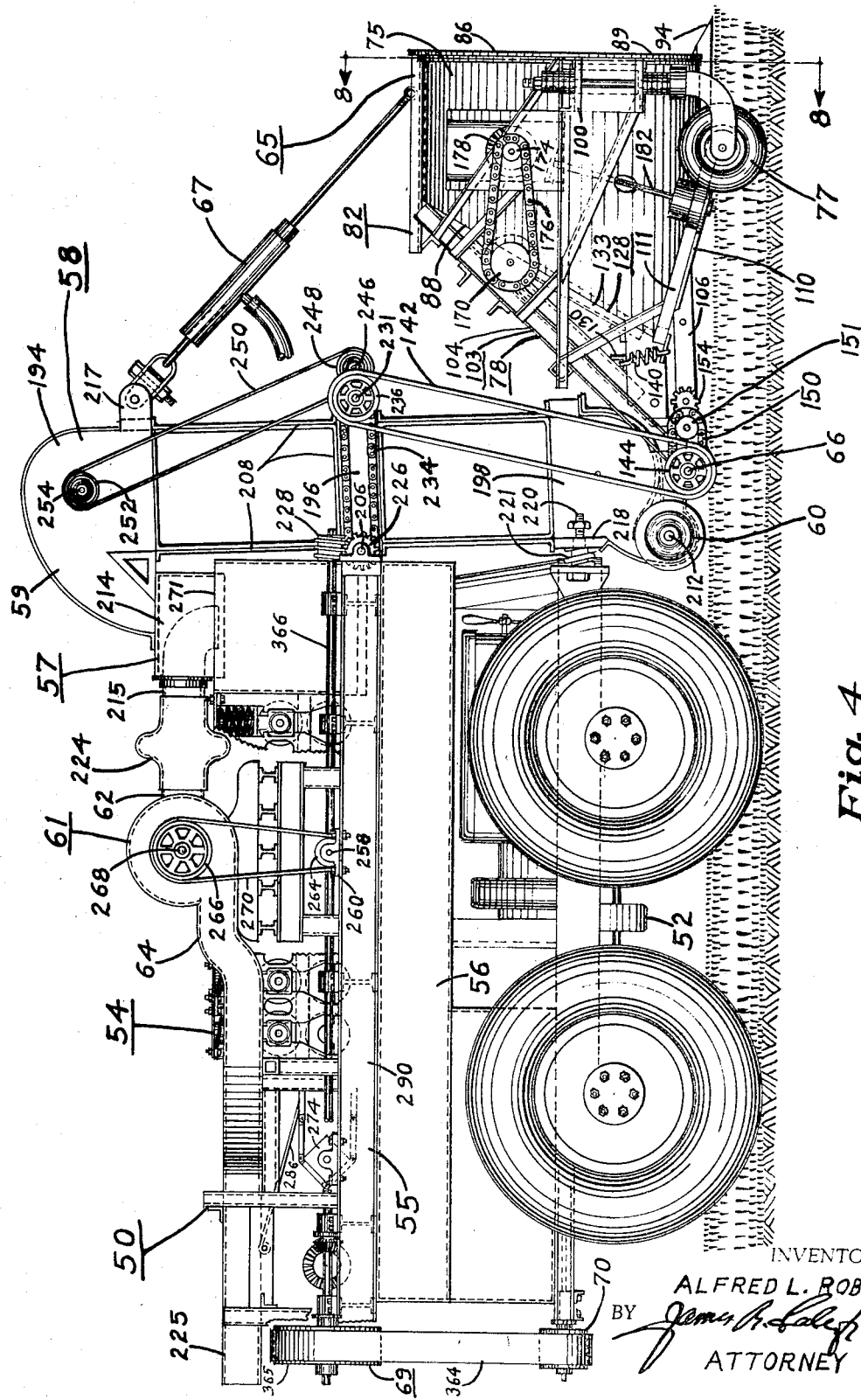

July 30, 1968  A. L. ROBERTS  3,394,535
APPARATUS AND METHOD OF HARVESTING AND PROCESSING SUGAR
CANE AND SIMILAR STALKED CROPS
Filed Feb. 25, 1965  11 Sheets-Sheet 5
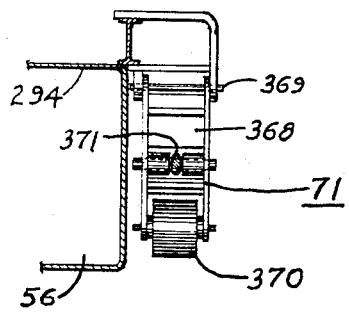
Fig. 6
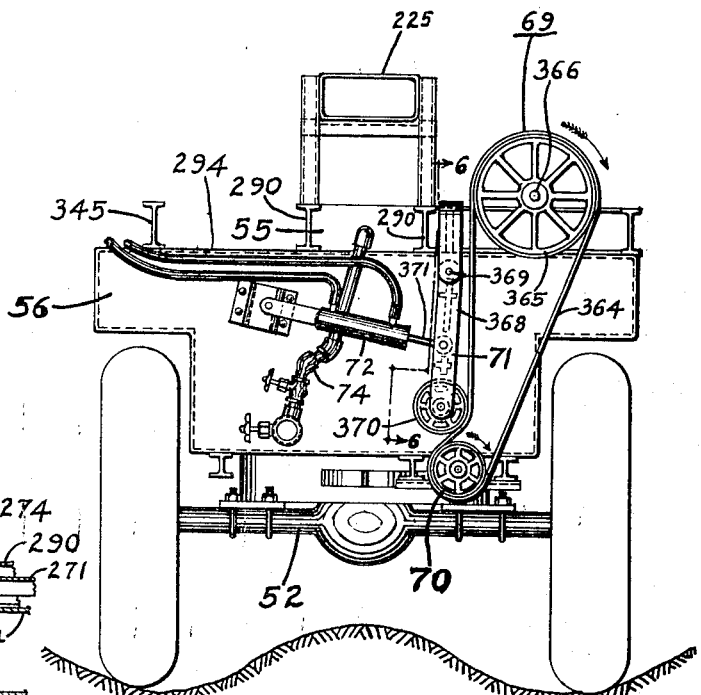
Fig. 5
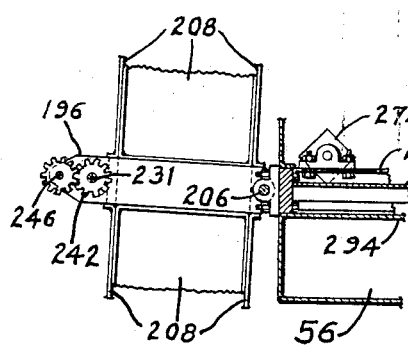
Fig. 9
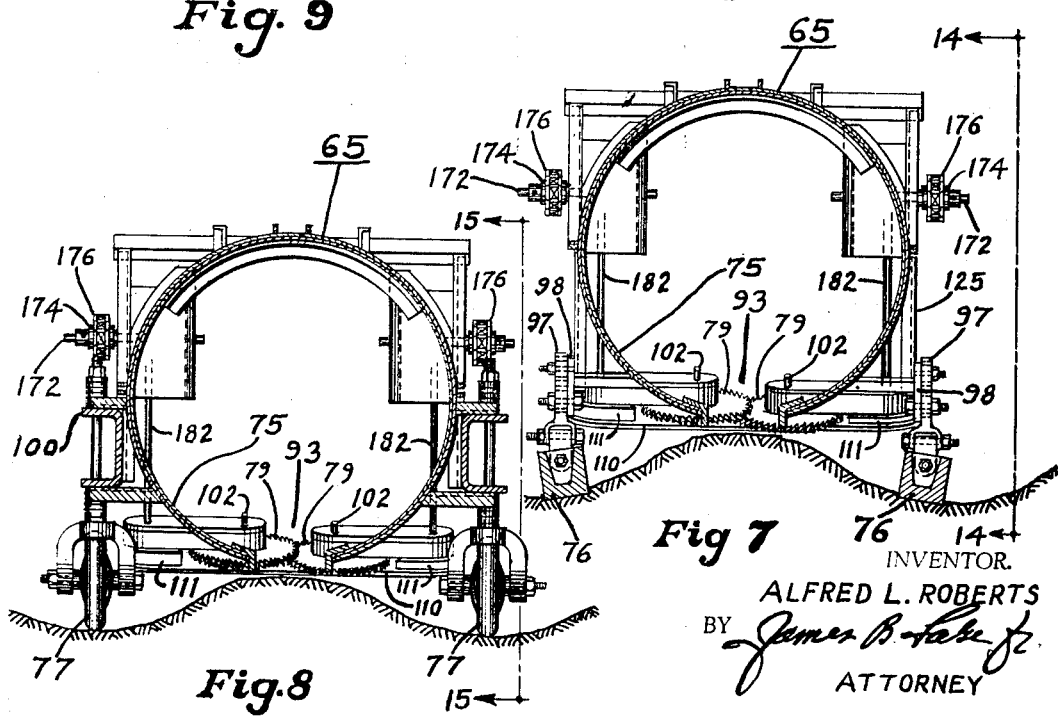
Fig. 7
Fig. 8
INVENTOR.
ALFRED L. ROBERTS
BY James B. Lake Jr.
ATTORNEY July 30, 1968　　　A. L. ROBERTS　　　3,394,535
APPARATUS AND METHOD OF HARVESTING AND PROCESSING SUGAR
CANE AND SIMILAR STALKED CROPS
Filed Feb. 25, 1965　　　11 Sheets-Sheet 6

INVENTOR.
ALFRED L. ROBERTS
BY
ATTORNEY

July 30, 1968  A. L. ROBERTS  3,394,535
APPARATUS AND METHOD OF HARVESTING AND PROCESSING SUGAR
CANE AND SIMILAR STALKED CROPS
Filed Feb. 25, 1965  11 Sheets-Sheet 8
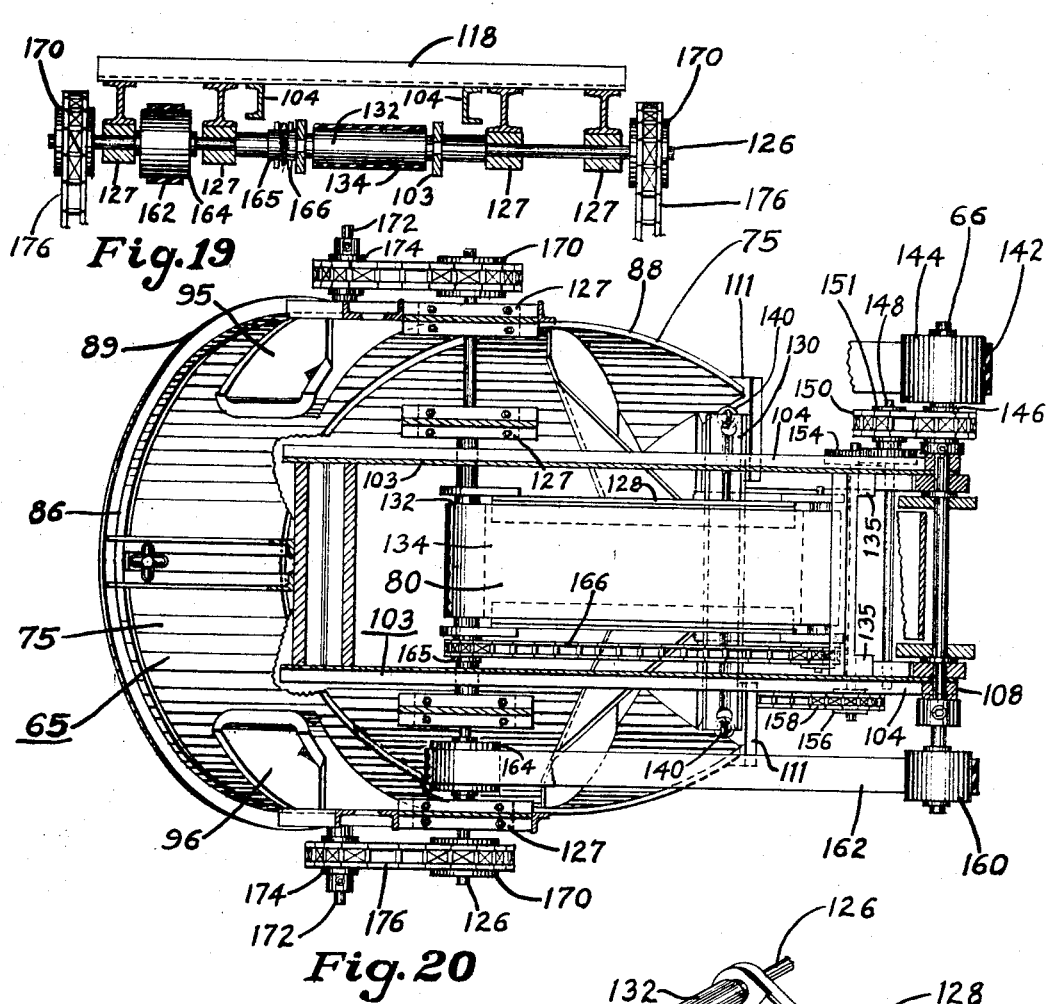
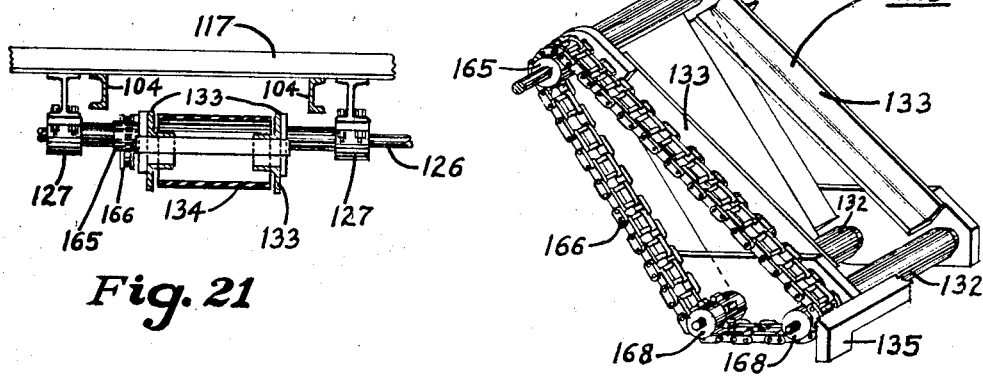
INVENTOR.
ALFRED L. ROBERTS
BY
ATTORNEY

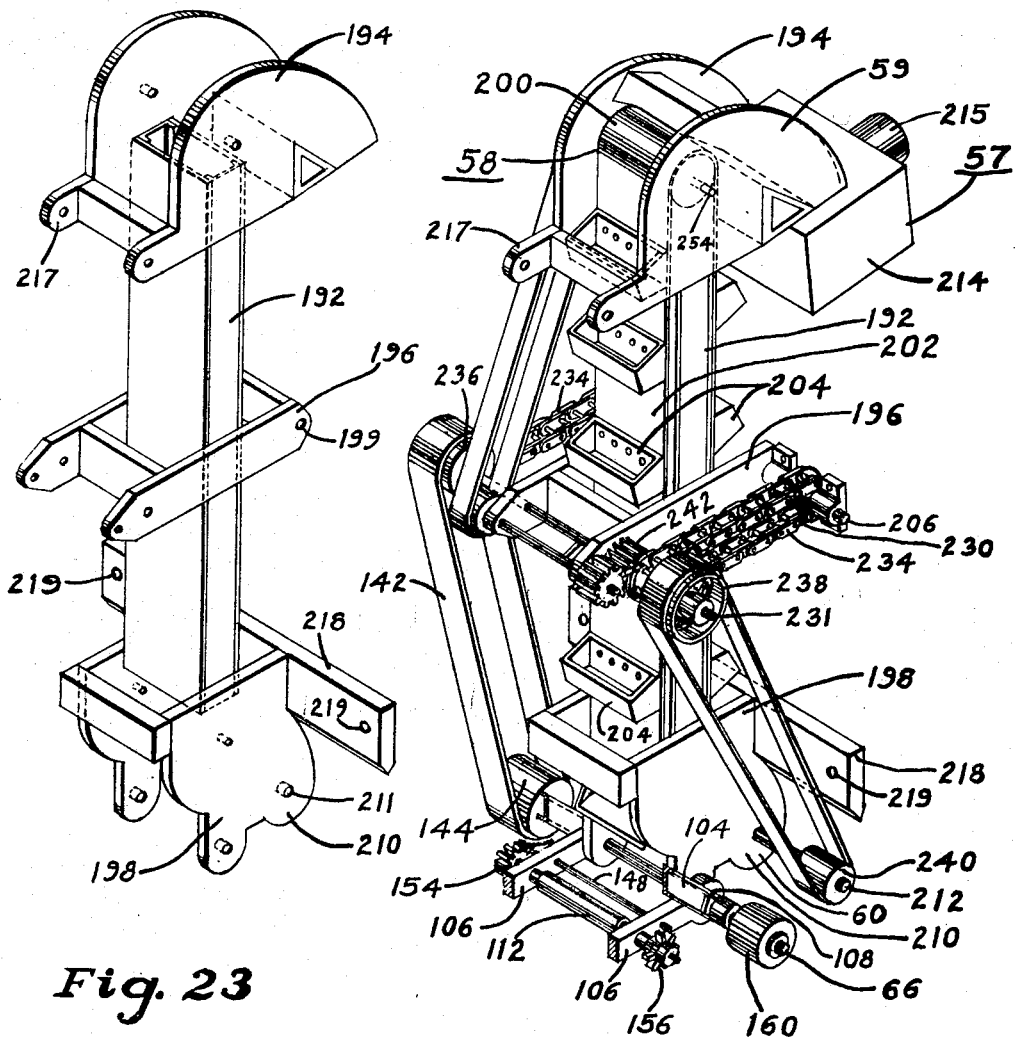
Fig. 23
Fig. 24
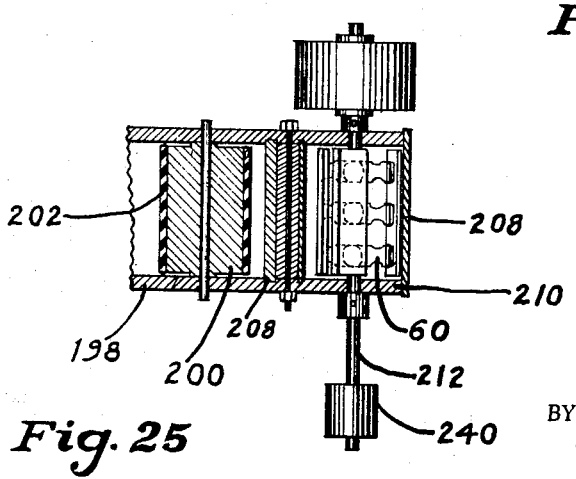
Fig. 25
INVENTOR.
ALFRED L. ROBERTS
BY
James B. Lake Jr.
ATTORNEY

INVENTOR.
ALFRED L. ROBERTS
BY
ATTORNEY

INVENTOR.
ALFRED L. ROBERTS
BY
ATTORNEY

United States Patent Office 3,394,535
Patented July 30, 1968

3,394,535
APPARATUS AND METHOD OF HARVESTING AND PROCESSING SUGAR CANE AND SIMILAR STALKED CROPS
Alfred L. Roberts, West Monroe, La., assignor to Sugarland Implements, Inc., West Monroe, La., a corporation of Louisiana
Filed Feb. 25, 1965, Ser. No. 435,231
7 Claims. (Cl. 56—17)

ABSTRACT OF THE DISCLOSURE

An apparatus for and a method of harvesting and crushing sugar cane having in mobile unitary combination a truncated cylindrical guide that aligns leaning cane by the application of force through leverages that vary with the displacement of the cane and its resistance to alignment, mowing and defoliating means, crushing apparatus having an endless belt comprising similar sequentially-hinged and perforated plates rotatably mounted on and extending between a driving and a driven prism-shaped pulleys whose respective circumferences comprise a plurality of flat planes each of which is similar to a said perforated plate between its hinged parts, a plurality of pairs of crushing rollers between which said endless belt extends, the bottom rollers comprising a plurality of axially spaced discs that support the endless belt and define passages for the extracted juice and reduces the weight of the apparatus, and means for returning the residual solids of the harvested cane to the field in readily assimilable form as fertilizer.

---

The invention relates generally to harvesters and the harvesting and processing of agricultural products and more particularly, to the apparatus and method for harvesting and processing sugar cane and similarly stalked agricultural products in a combined field operation.

The invention will be described with respect to sugar cane but it should be understood that it could equally apply to sorghum and similar crops.

In the harvesting of sugar cane, a major problem has been the large amount of labor required and how to reduce it. Current harvesters cut the cane if it has not been windblown and remains substantially straight and upright, and some machines remove the leafy tops and convey the cut cane to an accompanying truck or wagon. More generally the cut cane is collected in windrows and a burner is passed over the windrows to burn off the foliage. The windrows are then gathered and taken to the nearest road and loaded on large trucks for transportation to a raw sugar mill where the cane is crushed and the juice collected and converted into syrup and raw sugar. If it is desired to use the crushed stalks for ferilizing the fields, trucks must reconvey the crushed stalks or bagasse back to the fields where it is then redistributed theereover. The foliage is lost for this purpose, having been burned off the stalks.

Another major problem has been the deterioration of the cane between cutting and crushing. Cane begins to deteriorate in quality as a constantly increasing rate from the time of cutting or breaking of the surface. Therefore, the time interval between cutting and crushing should be as short as possible. The burning method of defoliating increases the rate of deterioration.

It is an object of the invention to provide a process for cutting cane, removing the foliage from the stalks, crushing the stalks, catching and storing the juice, and depositing the foliage and bagasse on the field in one continuous machine operation.

Another object of the invention is to provide apparatus for practicing the first object.

Another object is to provide a harvesting head that will harvest downed cane and align windblown cane to sever it an adjustable distance from the ground.

Another object of the invention is to provide means for separating the foliage from the stalks without burning.

Another object of the invention is to provide means for crushing the cane as it is harvested.

Another object of the invention is to provide means for catching and storing the cane juice as the cane is crushed in the fields.

Another object of the invention is to provide means for returning to the field the solid product remaining or bagasse at the end of the crushing operation, and the foliage as soon as it is separated from the stalks.

Figure 1:
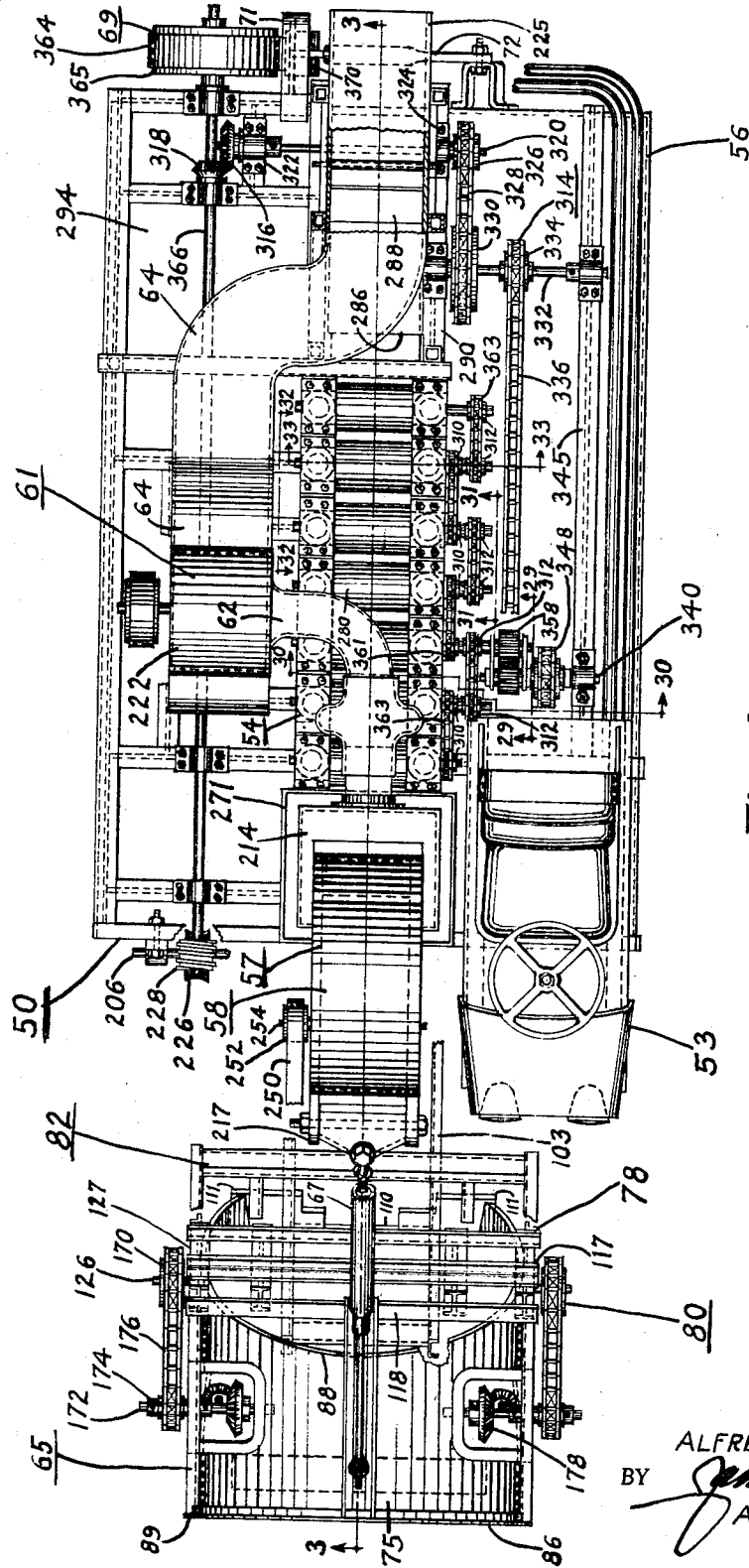
Figure 2:
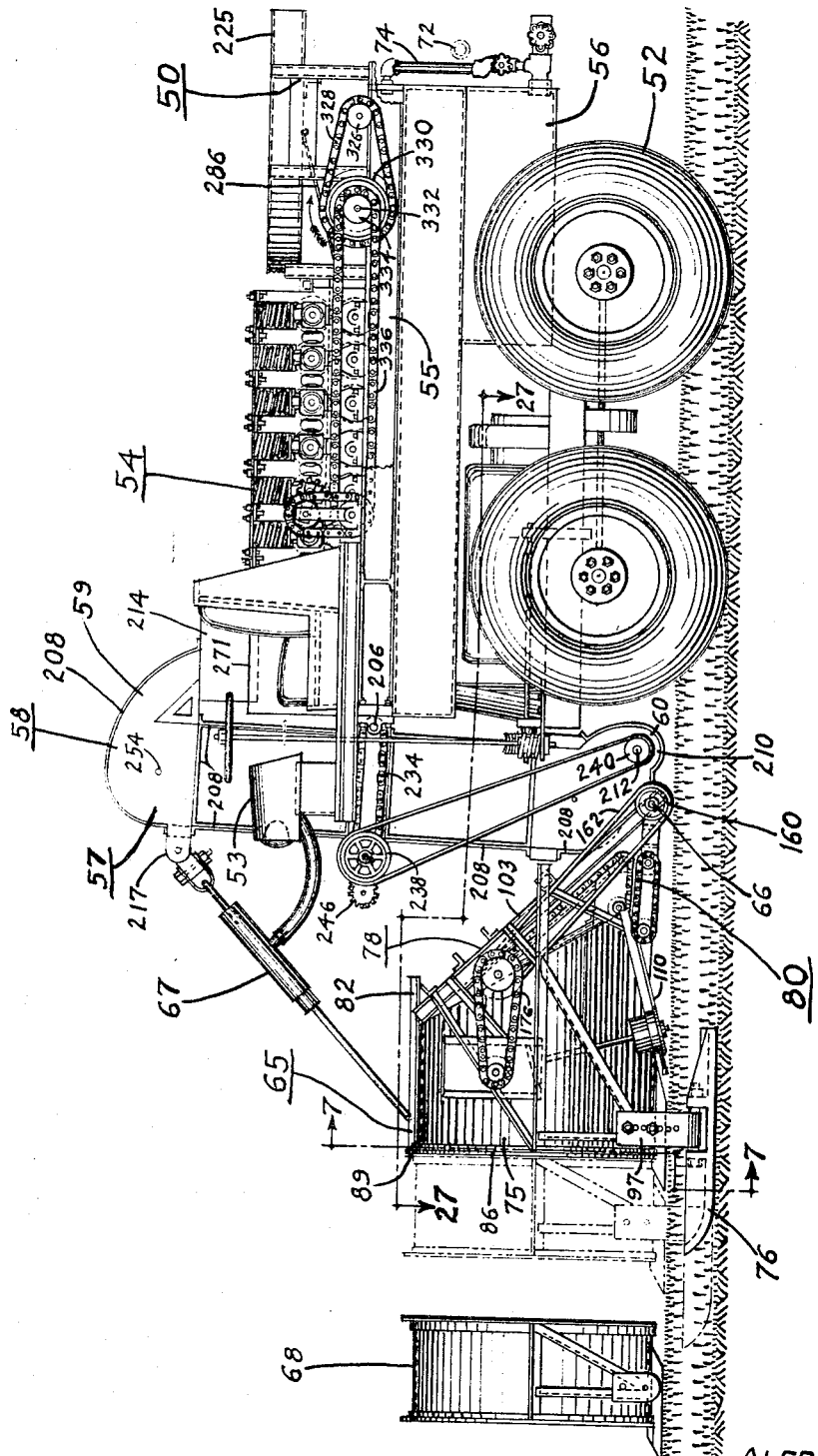
Figure 3:
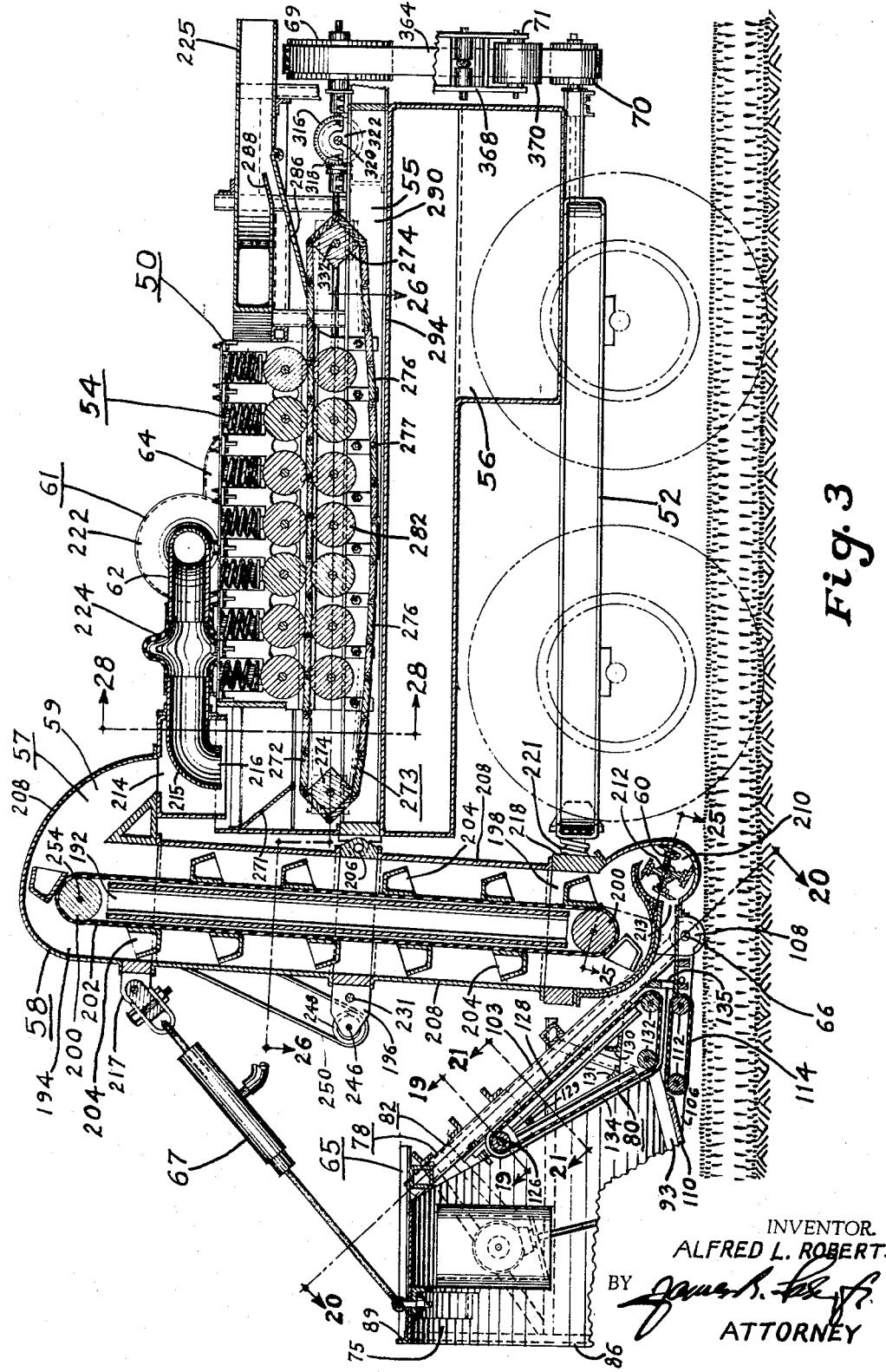
Figure 10:
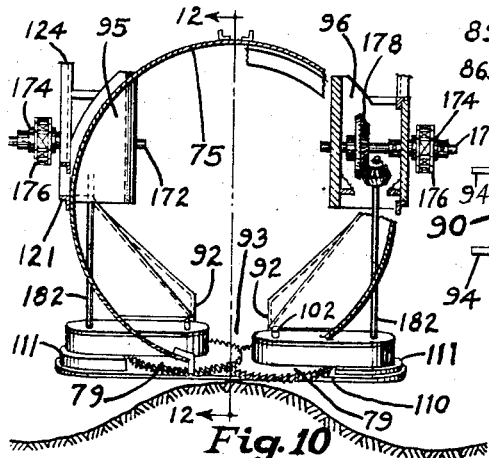
Figure 13:
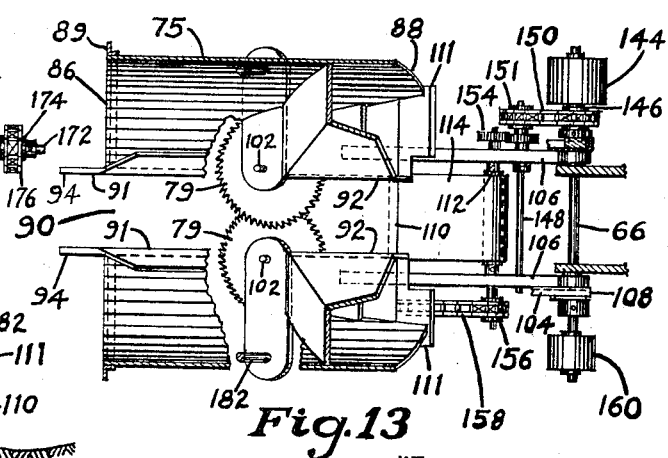
Figure 11:
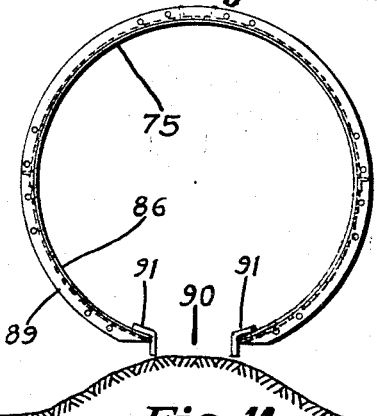
Figure 12:
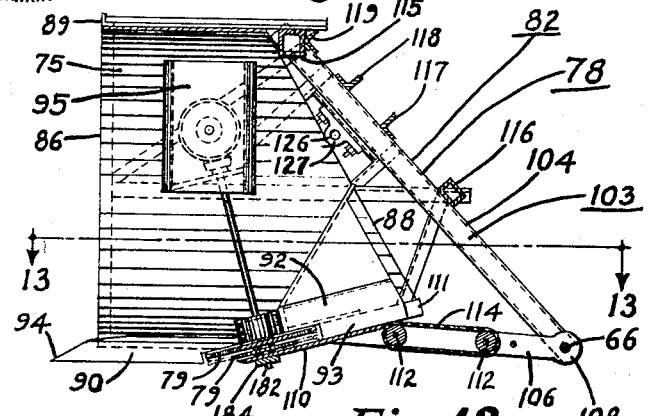
Figures 14, 15:
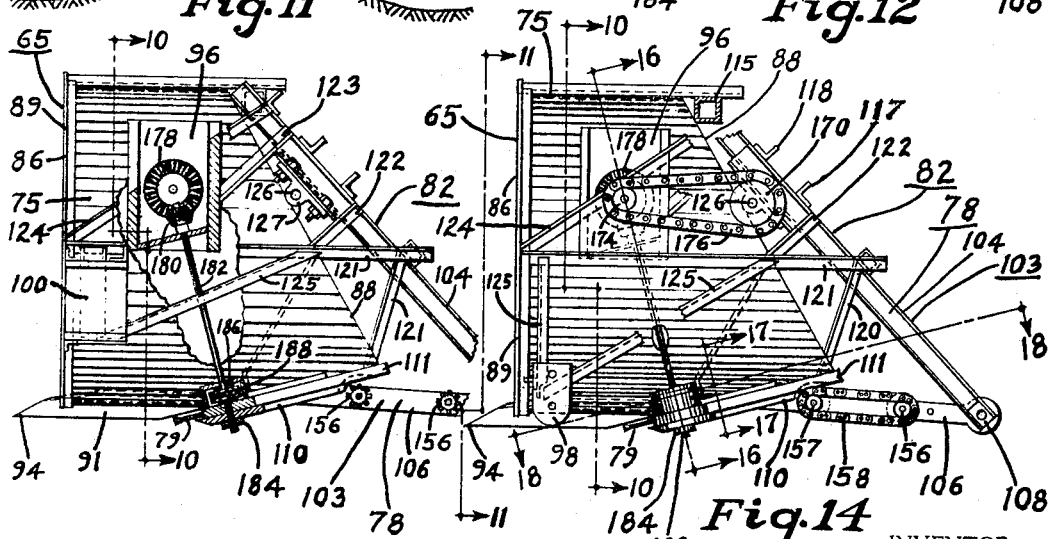
Figure 16:
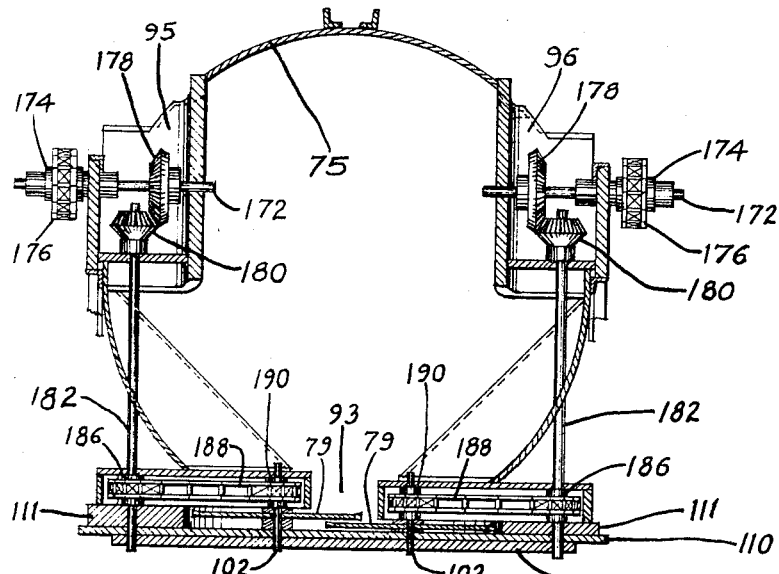
Figure 17:
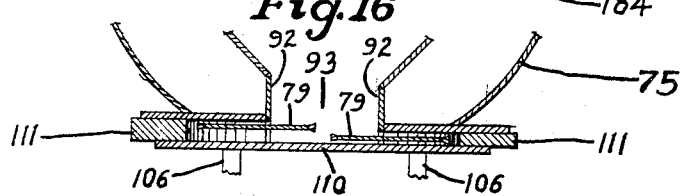
Figure 18:
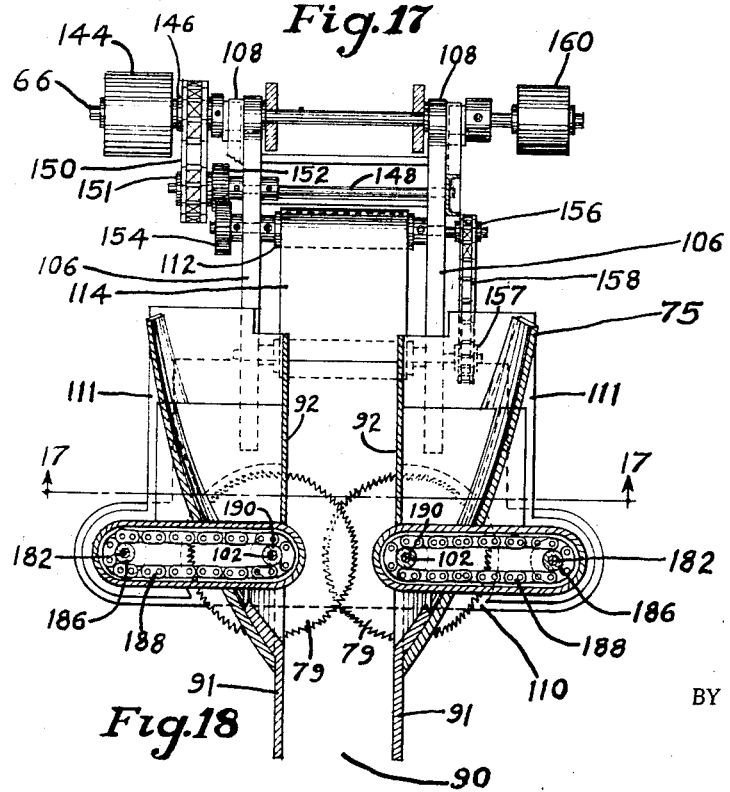
Figure 26:
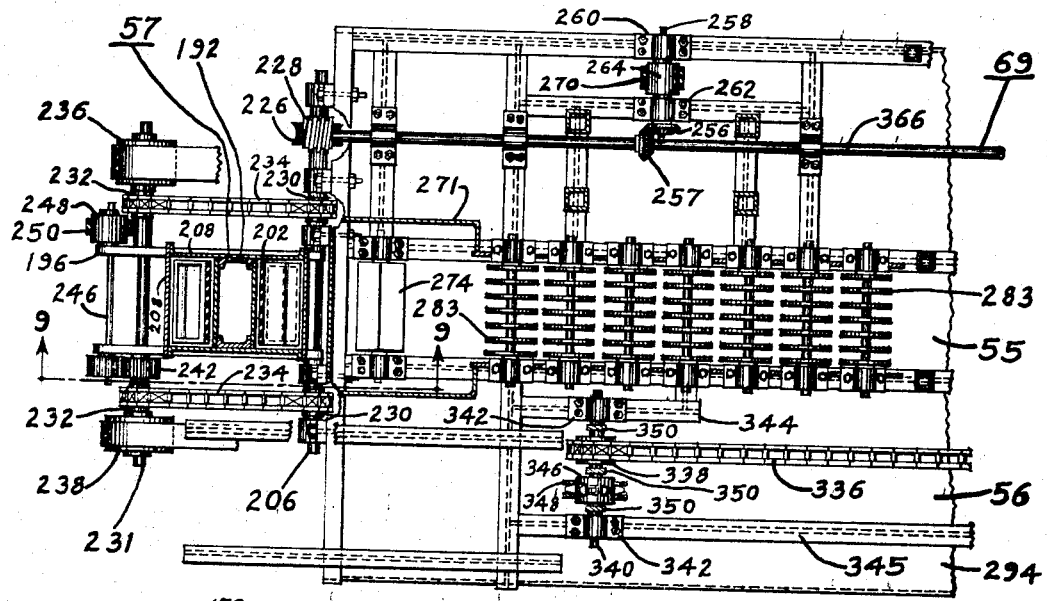
Figure 27:
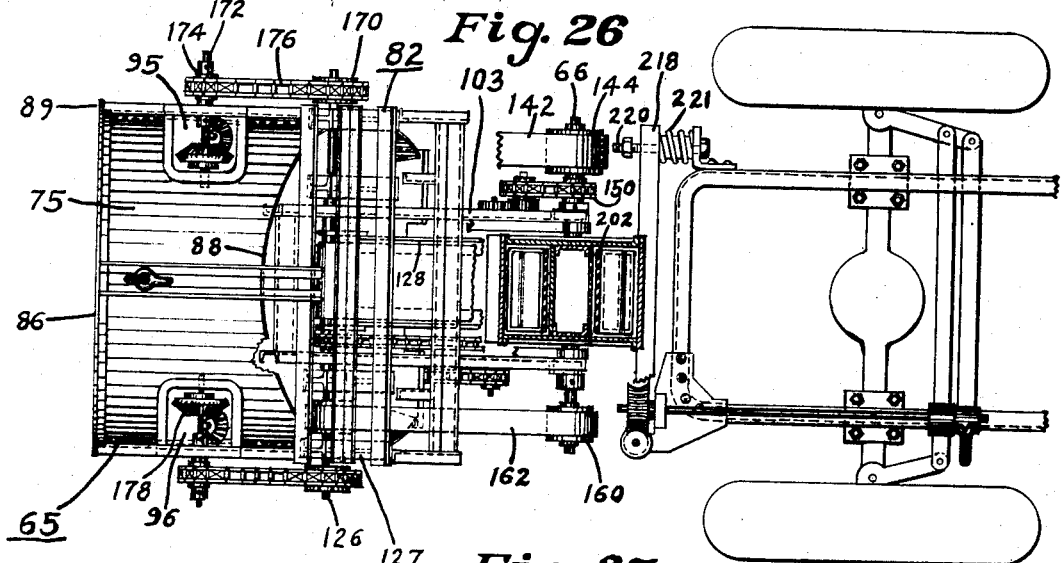
Figure 28:
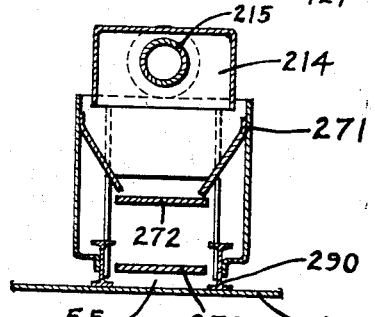
Figure 29:
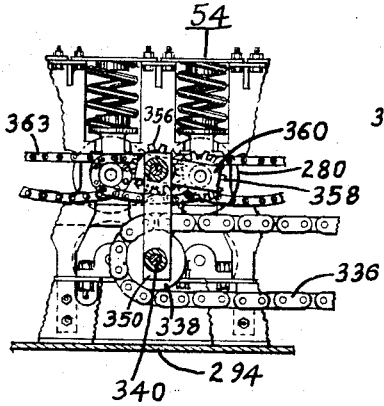
Figure 31:
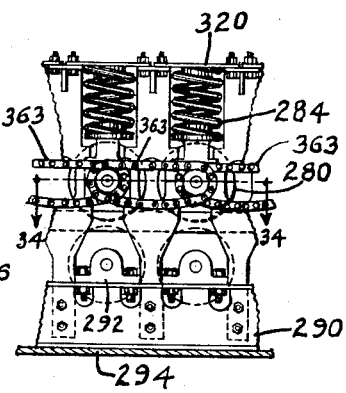
Figure 32:
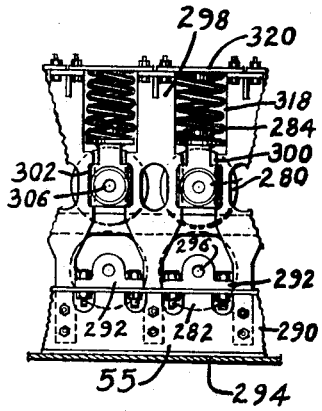
Figure 30:
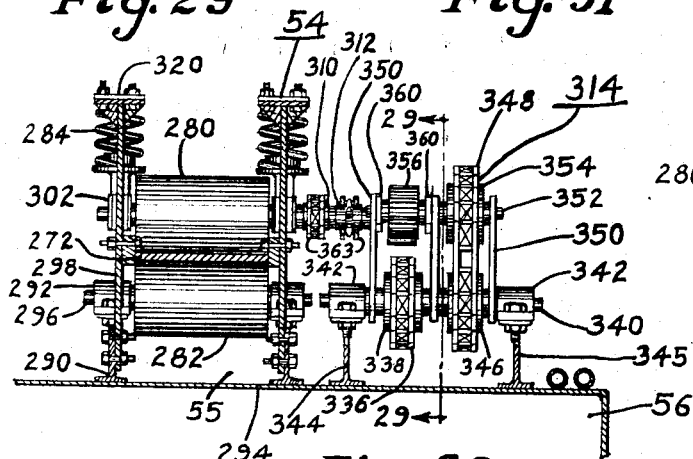
Figure 34:
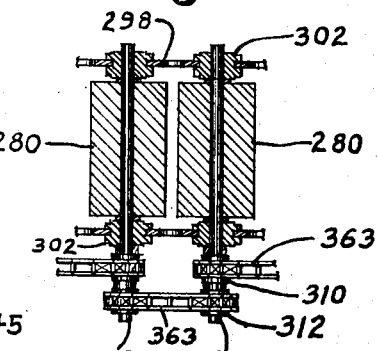
Figure 33:
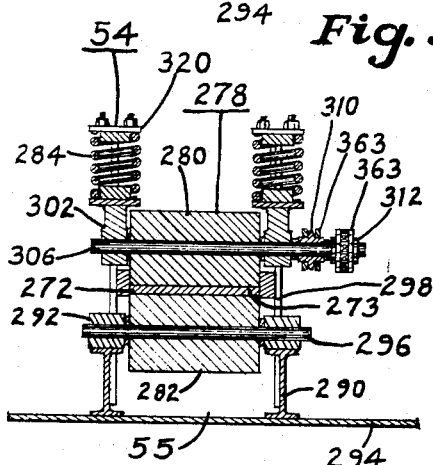
Figure 35:
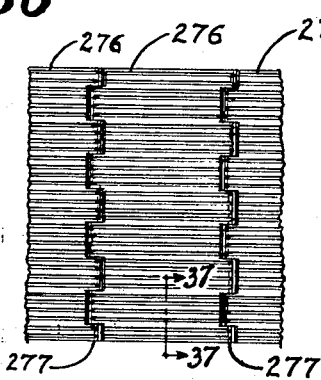
Figure 36:
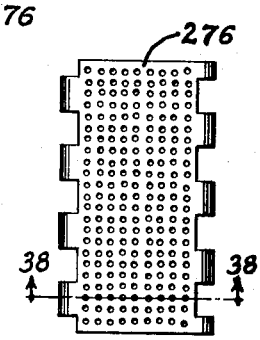
Figure 37:
Figure 38:

Other objects and a fuller understanding of the invention may be had by referring to the following description and claims, taken together with the accompanying drawings, in which:

FIGURE 1 is a plan view of the invention, showing harvesting head, tractor or power train, and tractor supported defoliating and cane crushing mechanisms, and auxiliary drives, FIGURE 2 is a left side view of the invention, with individual crusher roller chain drives omitted and showing an extension of harvesting head and a specie of harvesting head forward ground support and pivotal attachment thereof, FIGURE 3 is a lingitudinal section taken along section lines 3—3 of FIGURE 1 (see FIGURE 12 for breakaway section), FIGURE 4 is a right side view of the invention with another specie of forward ground support, FIGURE 5 is a rear end view of the invention, showing power take-off to the power drive and the clutch arrangement therebetween, FIGURE 6 is a sectional view along section lines 6—6 of FIGURE 5 showing detail of slack belt clutch mechanism, FIGURE 7 is a sectional view along section lines 7—7 of FIGURE 2 showing the harvesting head skid support, FIGURE 8 is a sectional view similar to FIGURE 7 along section lines 8—8 of FIGURE 4 showing harvesting head alternate wheel support, FIGURE 9 is a sectional view along section lines 9—9 of FIGURE 26 showing direction-reversing mechanism for driving an element of the defoliating mechanism, and swing shaft bearings, FIGURE 10 is a sectional view along section lines 10—10 of FIGURES 14 and 15 showing mechanism of the harvesting head, FIGURE 11 is a front view of the harvesting head showing mounting for extension, FIGURE 12 is a sectional view of the harvesting head along section lines 12—12 of FIGURE 10 showing breakaway part of FIGURE 3, FIGURE 13 is a sectional view of the harvesting head along section lines 13—13 of FIGURE 12 showing lower portion of the harvesting head, FIGURE 14 is a side view of the harvesting head of FIGURE 7 showing cutting mechanism and mounting details for support skid, FIGURE 15 is a side view similar to FIGURE 14 showing mounting for alternate wheel support of FIGURE 8, FIGURE 16 is a sectional view of harvesting head along section lines 16—16 of FIGURE 14 showing cutting mechanism drives, FIGURE 17 is a sectional view of the harvesting head along section lines 17—17 of FIGURE 14 showing details of cutting mechanism housings and channelway for the cut cane, FIGURE 18 is a sectional view in plan of the harvesting head along section lines 18—18 of FIGURE 14 showing juxtaposition of cutting mechanism, channelway, and part of the feed mechanism to defoliating mechanism, FIGURE 19 is a sectional view of the harvesting head along section lines 19—19 of FIGURE 3 showing details of swing shaft of swing frame, FIGURE 20 is a sectional view of the harvesting head along section lines 20—20 of FIGURE 3, showing details of a feedbelt and drives, FIGURE 21 is a sectional view of the harvesting head along section lines 21—21 of FIGURE 3, showing details of feedbelt support, FIGURE 22 is a perspective view of a swing frame for supporting a feedbelt, FIGURE 23 is a perspective view of the elevator frame of the defoliating mechanism, FIGURE 24 is a perspective view of the elevator frame showing drives and fittings, FIGURE 25 is a sectional view of the cane chopper or hog and lower end of the elevator along section lines 25—25 of FIGURE 3, FIGURE 26 is a sectional view in plan of the elevator and a specie of lower crushing rolls along section lines 26—26 of FIGURE 3, FIGURE 27 is a sectional view in plan along section lines 27—27 of FIGURE 2 showing harvester head, connection with power train and spring bumper, FIGURE 28 is a sectional view of the leaf and billet separator of the defoliating mechanism and crushing belt along section lines 28—28 of FIGURE 3, FIGURE 29 is a sectional view along section lines 29—29 of FIGURES 1 and 30 showing details of drives for upper crushing rollers, FIGURE 30 is a sectional view along section lines 30—30 of FIGURE 1 showing mechanism for driving a vertically displaceable upper crushing roller, FIGURE 31 is a side view along the line 31—31 of FIGURE 1 showing typical chain drive between adjacent upper crushing rollers, FIGURE 32 is a side view along lines 32—32 of FIGURE 1 showing details of vertically-displaceable upper crushing rollers, FIGURE 33 is a sectional view of a pair of upper and a second specie of lower crushing rollers taken along section lines 33—33 of FIGURE 1, showing details of the rigid and vertically-displaceable spring-loaded roller mounting, FIGURE 34 is a sectional view along lines 34—34 of FIGURE 31 showing the sliding upper crushing roller bearings, FIGURE 35 is a plan view of a segment of crushing chain showing linkage connection, FIGURE 36 is a plan view of an alternative link for a crushing chain, FIGURE 37 is a section view of the crushing chain link along section lines 37—37 of FIGURE 35, showing a grooved surface, and FIGURE 38 is a sectional view of an alternative crushing chain link along section lines 38—38 of FIGURE 36 showing holes defined through the link.

Referring to FIGURES 1-4, the invention is illustrated as a sugar cane harvester 50. The harvester 50 comprises in combination an engine driven tractor or power train 52 that serves as a mobile base and source of power and has a control station 53 mounted on its left forward corner. A tractor or power train found suitable for this use is known commercially as the "County Super Six" Model "SSE" distributed by the Ford Motor Company of Dearborn, Michigan. The tractor is diesel powered, 4-wheel drive, power steering with an auxiliary power take-off and a hydraulic power system. A crushing or grinding mill 54 is mounted on top approximately in the middle of the tractor 52 for pressing the juice from the sugar cane stalks. Catch and storage juice tanks 55 and 56 respectively are mounted on and to the tractor 52 and below the crushing mill 54 to receive the cane juice or liquid. A defoliating apparatus 57 is mounted on the front and on one side of the tractor or power train 52 and comprises an elevator 58 having a reversed upper end 59 and a chopper or hog 60 mounted in the lower end for chopping the harvested cane and foliage into approximately three inch billets and pieces; and a cyclone system 61 having its suction side 62 connected to the upper reversed end 59 of the elevator 58 for drawing off the leafy pieces from among the billets of cane as they fall by gravity from the reversed end of the elevator into the crushing mill 54. The leafy pieces are discharged from the pressure side 64 of the cyclone. A harvesting head 65 is pivotally secured to the bottom front of the elevator 58 by a horizontally-transverse swing shaft 66 and raisable thereabout by a hydraulic cylinder 67 and rod connecting the top of the harvester head 65 with the front upper part of the elevator. The harvesting head 65 alings the windblown and downed cane with the direction of travel of the harvester 50, severs it a desired adjustable distance from the ground and passes it back to the chopper 60. For extremely windblown and matted or two-year cane, a front extension 68 to the harvester head, shown apart and in phantom in place in FIGURE 2, is bolted to the front of said head (FIGURE 11). A power drive 69, shown in FIGURES 1, 3, 4 and 5, operates from a power take-off 70 at the rear of the tractor or power train, and supplies a plurality of auxiliary drives for operating the before mentioned components. A slack belt clutch 71 operable by hydraulic cylinder 72 serves to activate and deactivate the power drive 69 (see FIGURES 5 and 6).

In operation, the power train 52 pushes the harvester head 65 down a row of cane to straighten and cut the cane which is then passed to the defoliating apparatus 57 which separates the foliage from the cane billets as they fall together toward the crushing mill 54. The billets reach the mill and are crushed, the juice or liquid draining into catch tank 55, and the crushed billets are passed to the pressure side 64 of the cyclone system 61 and, with the separated foliage, blown on to the ground in the rear of the harvester 50. The catch tank 55 drains into storage tank 56 through connecting fittings 74. (See FIGURES 2 and 5.)

Referring to FIGURES 7, 8, 10-22, and 27, the harvesting head 65 comprises: a gathering hood 75 for engaging and aligning the growing cane; forward ground supports which may be sole plates or skids 76 (FIGURES 2 and 7), or wheels 77 (FIGURES 4 and 8) secured to the harvesting head 65 for movably supporting it; truss 78 with forwardly extending framework 82 secured to the gathering head 75 aft for pivotally connecting the harvesting head 65 to the rest of the harvester 50 and supporting the back of the harvesting head; a pair of cutting instruments that may be saws 79 (FIGURES 10, 12–14) mounted in the gathering hood 75 for partially overlapping rotation to cut the growing cane; a conveyor 80 (FIGURE 3) supported by said truss 78 for passing the cut cane to the defoliating apparatus 57; and auxiliary drive (FIGURES 2, 13) for rotating the saws 79 inwardly as viewed from the front of the gathering hood and for rotating the conveyor 80 (FIGURES 18 and 20) to pass the cane to the rear. The gathering hood 75 is in the shape of a truncated cylinder having one end defining a circle and the other end partially defining an ellipse and disposed in operative condition with its longitudinal axis in extenson of that of the power train 52 and approximately parallel with the ground and with its longest side adjacent thereto, and having its circular end 86 forward and its partially elliptical end 88 adjacent the power train or tractor (FIGURE 15). The forward circular end 86 is strengthened by a rim 89 and defines with the rim at its lowest part an opening 90 (FIGURE 11) extending inwardly that is reinforced on the longitudinal sides by angle plates 91 (FIGURE 18), internal upwardly extending walls 92 (FIGURES 12 and 17) together defining a cane passage or channelway 93 and extended externally by pick-up points 94 (FIGURE 4). The circular forward end 86 engages all upright and windblown cane as it travels down a row, and the pick-up points 94 engages the downed cane, the gathering hood 75 thereby engaging all the cane to align it aprroximately in the direction of travel of the harvester head and into the opening 90 and passageway 93. The harvester head extension 68 is a cylindrical extension of the circular end 86 of the gathering hood and has an opening congruent with opening 90 when it is bolted to the front end of the gathering hood. The extension 68 more accurately aligns windblown cane by reducing its maximum angular displacement from the direction of travel. Provision is made for moving the ground supports 76 or 77 forward and securing them on the extension when it is in use, as ground support 76 is shown in phantom in FIGURE 2.

Referring to FIGURES 10, 15 and 16, two recesses 95 and 96 are defined on each side of the upper part of the gathering hood 75 for receiving and supporting therein elements of the saws' auxiliary drive. The preferred forward ground supports for the harvesting head are sole plates 76 (FIGURES 2 and 7) attached by vertical members 97 thereto. The sole plates have pivot pin housings on their respetcive top surface. The vertical members each define a plurality of similar pairs of vertically spaced transverse holes in their upper parts and longitudinal pivot pin housings cooperative with the pivot pin housings on the sole plates, at their respective lower extremities. Mounting plates 98 are parts of the framework 82 and defines a pair of vertically-spaced transverse holes similar to and cooperative with the pairs of holes respectively defined by the vertical members 97. Sole plates 76 are longitudinally pivoted to respective vertical members by pivot pins engaged in the respective cooperative longitudinal pivot pin housings. The respective vertical members 97 are bolted to mounting plates 98, a pair of the plurality of pairs of said vertically spaced holes defined in the vertical members determining the height of the harvesting hood above the ground. Thus in the species illustrated in FIGURE 2, the sole plates are adjustable vertically and pivotal longitudinally to conform to the slope of the sides of the cultivated rows of cane.

In FIGURE 7 a preferred species of mounting is illustrated. The lower ends of the vertical members are forked and longitudinal pivot pin housings pivoted respectively with those of the sole plates have vertical extensions with transverse holes engaged in said respective forked ends of the vertical members by pivot pins through said transverse pivot holes and the pivot pin mountings of said forked ends. Thus in addition to the vertical adjustability and longitudinal pivoting of the species of FIGURE 2, the species of FIGURE 7 also is pivoted transversely. As illustrated in FIGURE 8, wheels can be used in place of the skids as an alternative front ground support. Mounting brackets 100 (FIGURES 8 and 15) are secured to the framework of the harvesting head and provide mounting pivotable about vertical axis and also adustable in height.

A pair of saws 79 are mounted for rotation on respective stub shafts 102 (FIGURE 8) at either side of the cane passageway 93, the saws overlapping in the center of said passageway. The stub shafts 102 are slanted to the rear to give a forward and downward tilt to the saws as shown in FIGURE 15.

The truss 78 comprises a pair of A frames 103, each having two rigidly connected arms, the A frame being rigidly cross-connected to each other. Referring to FIGURES 12 and 14, each A frame 103 comprises a long arm 104 and short arm 106, and their juncture defines a mounting 108 that is pivotally engaged by the transverse swing shaft 66. The short arm 106 (FIGURE 18) extends approximately horizontal and forward to immediately behind the saws 79 and the forward ends are beveled downward parallel with the downward tilt of said saws. A skid plate 110 (FIGURE 17) is fastened across said beveled ends extending below the saws and bridging the passageway 93 between the walls 92. Spacer plates 111 of unequal thickness compensate for the difference in height of the overlapping saws for levelly securing the skid plate sides thereto (FIGURE 17). Just in rear of the skid plate, the short arms 106 carry the lower part of conveyor 80 comprising two horizontally spaced driven rollers 112 and an endless conveyor belt 114 engaged thereon and between for passing the harvested can back to the defoliating apparatus 57. The long arms 104 (FIGURES 14, 15 and 20) extend forward and upward and are held in parallel spaced relation by cross members 115-119 (FIGURES 1, 12 and 27) which transversely extend beyond said long arm 104. Gathering hood stiffening and reinforcing members 120-124 (comprising the framework 82) extend from the crossmembers 115-119 of the truss (FIGURES 12, 14 and 15) and secure said hood to the truss 78. A brace 125 extends from the intersection of stiffening members 121 and 122 on the perimeter of the gathering hood 86 and extends forward and downward to brace mounting plate 98 (FIGURES 7 and 14) and mounting bracket 100 (FIGURES 8 and 15). A swing shaft 126 (FIGURES 3, 12, 19–22) is transversely mounted in bearings 127 on the underside of the cross arms 117 and 118 near the top of said truss. A triangularly shaped double swing frame 128 (FIGURE 22) forms the upper part of the conveyor 80 and is pivotally mounted on the swing shaft 126 at the junction of its two longest sides and with its shortest side in close proximity and orientation above conveyor belt 114 (FIGURE 3). Cross-members 129–131 transversely space and connect the similar double frame members 133 of the double swing frame (FIGURES 3 and 21). Transverse similar rollers 132 mounted for rotation at the respective angles of the triangularly shaped double swing frame carry an endless conveyor belt 134 for rotation around the swing frame as illustrated in FIGURE 3. A stop 135 on the swing frame 128 striking the elevator structure limits the pivoting of the swing frame on swing shaft 126 in the upward direction. Pivoting in the downward direction is limited by stop 135 striking the short arm 106 of the truss 78. Similar springs 140 (FIGURE 4 shows one spring only) connected between the ends of crossmember 130 and the spacer plates 111 biases the swing frame downward to engage stop 135 against the top surface of the short arm 106. Thus the swing frame can pivot upward to increase the separation of the upper 134 and lower 114 conveyor belts of the conveyor 80 to positively receive and convey varying amounts of cane passed to it.

Referring to FIGURES 4, 13, 18 and 20, the auxiliary drive for the saws and conveyor belts are taken from a drive belt 142 and pulley 144 driving swing shaft 66 that also pivotally connects the harvesting head to the rest of the apparatus.

Referring to FIGURE 18, a sprocket 146 fixed to swing shaft 66 drives a parallel, reverse rotation shaft 148 by means of chain 150 and sprocket 151 fixed on said shaft 148 which also mounts a gear 152 rotatable therewith. A gear 154 is mounted on one end of the rear roller 112 of the lower part of the conveyor 80 and adapted to engage gear 152 to provide a reverse rotation for driving the upper reach of conveyor belt 114 rearwardly. A sprocket 156 mounted on the other end of rear roller 112 drives a sprocket 157 on the end of the forward roller 112 through chain 158, whereby both rollers are driven to rotate conveyor belt 114. A pulley 160 is mounted on the other end of swing shaft 66 from the pulley 144 and by belt 162 drives pulley 164 fixed to swing shaft 126 (FIGURE 19). The upper roller 132 of the swing frame is fixed to swing shaft 126 and rotates with it. A sprocket 165 is also fixed to said swing shaft adjacent said upper roller 132 and by chain 166 drives sprockets 168 fixed to the lower rollers 132, thereby making all rollers of the conveyor 80 driven rollers. Similar sprockets 170 respectively fixed to the ends of swing shaft 126 drive the saws 79 through similar intermediate drive mechanism, only one of which will be described.

Referring to FIGURES 10, 14, 16 and 20, a stub shaft 172 is transversely mounted for rotation in the gathering hood recess 96. A sprocket 174 is mounted on the outboard end of said shaft and is driven by a chain 176 from sprocket 170 of swing shaft 126. A crown gear 178 is mounted inboard of sprocket 174 of said stub shaft and rotates with it. A complementary crown gear 180 is fixed to the end of a downwardly extending drive shaft 182 that extends through the side of the gathering hood and is journaled for rotation in the spacer plates 111 and skid 110 plates, and a reinforcing bar 184. A sprocket 186 is fixed to the shaft 182 and rotates by interconnecting the chain 188 a sprocket 190 fixed on the stub shaft 102 on which is fixed saw 79 (FIGURE 18).

Referring to FIGURES 3, 23, 24 and 25, the elevator 58 of the defoliating apparatus 57 comprises a vertical center beam 192 having top 194, intermediate 196, and bottom 198 fittings. The top and bottom fittings 194 and 198 respectively are adapted to mount similar rollers 200 at each end. An endless elevator conveyor belt 202, on which are spaced open-mouthed containers 204, is mounted on rollers 200 for movement therebetween. The intermediate fitting 196 defines a transverse mounting 199 for an elevator swing shaft 206 that pivotally connects the elevator to the forward end of the crushing mill (FIGURE 26). A skin or covering 208 is spaced before and behind, and above and below, the center beam to allow free passage of the containers 204 on the elevator belt as it travels around its rollers 200. The bottom fitting also defines with the skin a chopper housing 210 and a mounting 211 for the rotation thereon a shaft 212, an entranceway 213 for the harvested cane into said housing from conveyor 80, and an exit from said housing through which the chopped foliage and cane are thrown by the action of the chopper into the path of the containers 204 as they are carried by belt 202 around rollers 200. The containers scoop up the cut foliage and cane billets as they round the bottom roller and dump it as they round the top roller into the reverse upper end 59 which defines a bottomless chamber 214 into which an air conduit "el" 215 is fitted with the interior end 216 opening downward (FIGURE 3). The upper fitting 194 also carries a forward facing "eye" fitting 217 to which is secured the hydraulic cylinder 67 and rod for raising the harvesting head 65 clear of the ground when turning the harvester 50. The bottom fitting further incorporates a transverse rear bumper plate 218 in the ends of which are defined respective bolt holes 219 for loosely bolting the bottom fitting to the tractor chassis with bolts 220 as shown in FIGURES 4 and 27. Bumper springs 221 are mounted in compression on the bolts 220 intermediate the tractor and elevator to damp and absorb any jolts resulting from minor obstruction to the free passage of the harvesting head. Pivoting of the elevator around swing shaft 206 is limited by the length of the bolt.

Referring to FIGURES 3 and 28, the cyclone system 61 part of the defoliating system 57 comprises a blower 222 mounted on one side and near the forward end of the tractor chassis 52 with its suction side 62 connected through flexible connector 224 to the exterior end of the air conduit "el" 215. The pressure side 64 of the cyclone is connected to an air conduit 225 that extends to the rear of the chassis.

Referring to FIGURES 4 and 26, the auxiliary drive for the defoliating apparatus 57 comprises for the elevator a takeoff gear 226 mounted on swing shaft 206 in operative engagement with a worm gear 228 mounted on the forward end of the power drive 69. Two similar sprockets 230 fixed on and rotating with swing shaft 206 together drive the transverse shaft 231 mounted for rotation in the front part of the intermediate fitting by means of two similar sprockets 232 mounted thereon and similar chains 234 operatively connecting sprockets 230 and 232 on opposite sides of the elevator. Two pulleys 236 and 238 are respectively mounted on the end of transverse shaft 231. The right pulley 236 drives the swing shaft 66 of the harvesting head to activate the auxiliary drive 80 therefor. The left pulley 238 drives a pulley 240 mounted on shaft 212 for rotating the chopper 60. A spur gear 242 also fixed on shaft 231 drives another similar spur gear fixed on a shaft 246 mounted for opposite rotation in the intermediate fitting forward of and parallel to shaft 231. A pulley 248 on shaft 246 by means of belt 250 drives a pulley 252 fixed on the end of a shaft 254 that mounts the upper roller 200 for rotation in the top fitting 194 and thereby drives the elevator conveyor belt around the lower idler roller. The auxiliary drive for driving the cyclone comprises a crown gear 256 take-off from an associate crown gear 257 of the power drive 69 (FIGURE 26). Crown gear 256 is fixed on a transverse shaft 258 that journals in bearings 260 and 262. A pulley 264 is mounted intermediate said bearings for rotation with said shaft. A pulley 266 is fixed on the shaft 268 mounted for rotation in the cyclone and in the vertical plane of pulley 264. A belt 270 operatively engages the two pulleys to drive the cyclone.

The crushing or grinding mill 54 comprises hopper 271 at its forward part into which the chamber 214 of the reverse upper end 59 of the elevator loosely fits (FIGURES 3 and 28). As the leafy pieces and cane billets fall from the containers going around the upper roller and into the reverse end, they fall past the interior end of the air conduit "el" connected to the suction end of the cyclone which draws in the leafy pieces, the billets falling into and through the hopper 271. The forward end of a crushing chain conveyor 272 is mounted directly below the hopper 271 and receives the cane billets. The endless chain 273 of the conveyor is mounted on two similar square pulleys 274 mounted for rotation at the extremities of the crushing mill. The sides of the square pulleys correspond in length and width with the individual links 276 comprising the chain. The links (FIGURES 35–38) are joined by piano hinges 277 and may have their upper surface longitudinally scored for catching the juice from the crushed stalks (FIGURES 35 and 37) and to carry and dump it in the catch tank 55 at the end of the upper reach of the chain 273 as it goes around the rear square pulley. Another specie of the link is illustrated in FIGURE 36 in which holes are defined through the link and permit the juice to run directly into the catch tank. The pulleys 274 are mounted for rotation and transversely with respect to the longitudinal axis of the tractor chassis.

Referring to FIGURES 30 and 33, pairs of crushing rollers 278, each comprising an upper roller 280 and a lower roller 282 are rotationally mounted in line with the square pulleys and with their respective axes of rotation parallel thereto and with the upper reach of the crushing chain 272 passing between the upper and lower rollers of each pair. The lower rollers 282 may be solid. Another specie of lower roller 283 for use with the second specie of link 276 may be a plurality of metal discs transversely spaced apart and fixed to a shaft for rotation therewith. The disc roller provides direct passage from link to catch tank 55. The lower rollers 282 are rigidly mounted but the upper rollers 280 are flexibly mounted to move vertically and are spring biased downward into contact with the crushing chain by springs 284 mounted above each upper roller. The springs of the first roller to the last are designed and mounted to exert progressively greater downward biasing force on their respective upper rollers, so that billets of cane carried by the crushing chain between the pairs of rollers are subjected to increasing pressures as they pass successive pairs of rollers in going through the mill. A pickup plate 286 is mounted intermediate the rear pair of crushing rollers and the rear square pulley and extends upward and rearward from the crushing chain into the cyclone pressure conduit 225.

The lower side 288 of the conduit 225 forward of the junction of the pickup plate 286 is bent upward to create a venturi tube effect that tends to draw into the conduit the crushed billets or bagasse, that is diverted from the crushing chain by the pickup plate, and pushed up said plate by pressure of the following bagasse into the venturi portion of the conduit and is blown therefrom over the rear of the tractor chassis along with the leafy trash from the reverse upper end of the elevator to fertilize the field.

Referring to FIGURES 32, 33 and 34, the details of mounting the crushing rollers are given below. Only one pair will be described, it being understood that the pairs are identical except for progressively stronger biasing springs 284 from the first to the last pairs. A pair of transversely spaced I beams 290 that also define the sides of catch tank 55 rigidly support a plurality of pairs of journals 292 equidistant from the deck 294 and top of the storage tank 56 (FIGURE 33). A shaft 296 is rigidly mounted for rotation in a pair of said journals 292. A lower roller 282 is fixed to and rotates with said rigidly mounted shaft 296. All the lower rollers are idler rollers and are rotated only by the passage of the endless chain 273 over them. A pair of side plates 298 are bolted to the I beams 290 and extend above the fixed journals 292 to define recesses 300, each recess having parallel vertical sides above the crushing chain and below the springs 284. Upper journals 302 are channeled (FIGURE 34) along each side to slidably engage the parallel vertical sides of these recesses (FIGURE 32). Upper shaft 306 is mounted for rotation in the vertically slidable journals. An upper roller 280 is fixed on and rotates with said upper shaft. The upper shaft is longer than the lower shaft and carries two sprockets 310 and 312 on the outwardly extending shaft end by means of which the upper shafts and rollers are driven by an auxiliary drive 314. The biasing springs 284 are mounted on each upper journal in widened recesses 318 defined in the side plates immediately above the journal recesses. A top plate 320 is secured over the side plates to place the springs in compression and bias downward the upper journals, and the shaft with roller mounted for rotation therein.

The auxiliary drive for driving the rear square pulley and the upper crushing rollers comprises a crown gear 316 (FIGURE 1) take-off at right angles to an associated crown gear 318 of the power drive 69. Crown gear 316 is mounted on the end of transverse shaft 320 journaled in bearings 322 and 324 for rotation. A sprocket 326 is mounted on the other end of shaft 320 outboard of bearing 324. An endless chain 328 operatively connects sprocket 326 with another sprocket 330 fixed on a shaft 332 on which the square pulley is fixed for rotation and which is thereby rotated by said auxiliary drive. Shaft 332 carries another sprocket 334 outboard of sprocket 330 which drives another endless chain 336. An associated sprocket 338 is driven by chain 336 (FIGURE 30). Sprocket 338 is located between the second and third pair of crushing rollers from the forward end of the mill and is fixed on a transverse shaft 340 journaled in bearings 342 and supported br legs 344 and 345 from the deck 294 and about the same distance above the deck as the lower roller shaft 296. A second sprocket 346 is fixed on shaft 340 and drives an endless chain 348. Three straight arms 350 are swingably attached to shaft 340 and to a second shaft 352 which they support above shaft 340 at approximately the same height as the vertically flexible upper roller shafts 306. A sprocket 354 is fixed to shaft 352 intermediate the outboard two of the three straight arms 350 and in the same vertical plane as sprocket 346 and is driven by chain 348 in vertical reaches. A spur gear 356 is fixed to shaft 352 between the inboard two of the three straight arms. A second spur gear 358 is held in permanent mesh with spur gear 356 as a planetary gear by arms 360. This planetary spur gear 358 is also fixed for rotation on and with the opposing third upper roller shaft (FIGURES 1 and 29). This arrangement provides a knee action that drives the upper roller in reverse rotation without affecting its vertically flexibility. Each intermediate upper roller shaft has two sprockets 310 and 312 fixed in succession to the outboard end adjacent the auxiliary drive. The first and last upper roller shafts have one sprocket each. Endless similar chains 363 (FIGURE 31) connect the outer sprockets 312 of adjacent upper roller shafts on one side of an upper roller and the inner sprockets 310 on the other side. The chains 363 are arranged for the rotation of the upper rollers in the proper direction to keep their upper reaches in tension rather than the lower reaches to provide enough slack for possible vertical moment of the sprockets to maintain a positive drive of the rollers and to not interfere with the other reach.

The power drive 69 comprises an endless slack belt 364 take-off from the tractor chassis take-off 70. The slack belt 364, when the slack is taken up, drives a pulley 365 mounted for rotation with a shaft 366 extending the length of the tractor chassis. The slack belt clutch 71 is mounted on the rear of the tractor chassis to take up this slack when it is desired to activate the power drive 69. This clutch comprises an arm 368 pivoted on pivot 369 to the rear of the tractor chassis in the plane of rotation of the slack belt but outside its reaches. A pulley 370 is mounted for rotation at one end of arm 368 and adapted to engage a reach of the slack belt to remove the slack when the arm is pivoted against belt 364. The hydraulic cylinder 72 is pivoted to the chassis with its operative end 371 connected to the arm 368 between the pulley 370 and the arm pivot 369 and adapted to swing the arm to remove the slack from the slack belt when the cylinder is activated to extend its operative end 371, and to allow slack in the belt when the operative end is retracted. The longitudinal shaft 366 rotated by the pulley 365 (FIGURE 1) has fixed on it for rotation with it the crown gear 318 for driving the auxiliary drive for running the crushing mill, the crown gear 257 for driving the auxiliary drive for running the cyclone part of the defoliating apparatus, and the worm gear 228 for driving the auxiliary drive for running the elevator part of the defoliating apparatus and for driving the auxiliary drive for running the harvester head.

Although we have described the invention with a certain degree of particularity, it is understood that the present disclosure has been made by way of example and that numerous changes in the details of construction and the combination and arrangement of parts may be resorted to without departing from the spirit and scope of the invention as hereinafter claimed.

I claim:

1. An improved sugar cane and similar stalked crop harvester mounted on a power train or tractor and comprising in combination: annular aligning means attached to the front of said power train for aligning the stalks of said stalked crops, said annular aligning means having a slot adjacent the lower portion thereof to admit stalks in advance of being severed; cutting means rearward of the annular aligning means and in alignment with said slot for severing the aligned stalks adjacent the ground; defoliating and billeting means for cutting the harvested stalks into billets and separating said billets from the foliage; a plurality of stages of crushing means mounted on said power train for sequentially crushing said billets and thereby extracting the juice therefrom; articulated flat plate conveyor means mounted adjacent said crushing means for receiving and conveying said billets through said plurality of stages of crushing means and in cooperation with said stages separating the liquid from the solid residues of said billets without any reabsorption of the liquid; and auxiliary power means operationally connected to all said means for activating them in the performance of their respective functions, whereby said stalked crops are harvested and processed in continuous mechanical operation by the harvester passing up and down the rows and through the fields.

2. An improved harvester as described in claim 1 characterized in that said cutting and annular aligning means comprise in combination: a truss mounted on the front of said power train; a forwardly extending framework secured to said truss; a circular gathering hood attached to said truss and framework for aligning said stalked crops; vertical members, each defining a longitudinal journal at its lower extremity and a plurality of similar pairs of vertically-spaced transverse holes defined in said framework to provide vertical adjustment of the front end of said cutting and annular aligning means; sole plates, each respectively pivotally secured to a vertical member by a pin engaged in said longitudinal journal and the cooperating sole plate, whereby said sole plates are pivotable longitudinally to conform to the sloped sides of the planted rows and are adjustable vertically to position the cutting and annular aligning means above the ground.

3. An improved harvester as described in claim 1 characterized in that said cutting and annular aligning means comprise in combination: a truss mounted on the front of said power train; a forwardly extending framework secured to said truss; a circular gathering hood attached to said truss and frame work for aligning said stalked crops; vertical members respectively adapted to being secured, vertically adjustable by their respective upper ends to forward transversely spaced parts of said forwardly extending framework and having respectively forked lower ends with transverse intermediate members having their upper ends adapted to being pivoted transversely in said forked ends of said vertical members and defining longitudinal pivot mountings in their respective lower extremites; and sole plates adapted to being respectively pivoted in said longitudinal pivot mountings defined by the lower ends of said intermediate members, whereby said sole plates are pivoted longitudinally to conform to the ground over which it passes.

4. An apparatus as described in claim 1 wherein said crushing means comprise: a base mounted on said power train, a plurality of horizontally transverse crushing rollers mounted on said base and arranged vertically in pairs with horizontal axes parallel each pair, comprising an upper roller and a lower roller, and the pairs arranged longitudinally in a column of pairs, the same half of said pairs being rigidly mounted for rotation in common horizontal plane, and the other half of said pairs being mounted, flexible vertically, for rotation; a crushing chain conveyor comprising pulleys prismatically shaped in cross-section respectively mounted on said base for rotation on transverse axes mounted in a common horizontal plane, an endless chain comprising plates sequentially hinged and adapted to cooperate for rotation on and around said pulleys and arranged for a reach of said endless chain to pass between all said upper and lower rollers and extend therebeyond; biasing means mounted with each said pair of rollers for biasing said flexible vertically mounted half of said pairs of rollers into crushing contact with said reach of said endless chain supported by said rigidly mounted half of said pairs of rollers; a hopper mounted over the forward end of said endless chain for receiving and directing defoliated stalks onto said endless chain for conveyance between said pairs and through said longitudinal column of crushing rollers.

5. A crushing means as described in claim 4 wherein said lower rollers each comprise; a shaft mounted for rotation, a plurality of discs fixed on said shaft concentric therewith and axially spaced apart thereon, said discs and shaft outlining a roller for support of the plates comprising said endless belt, and defining a plurality of spaces between said discs thereby providing passage for the unimpeded flow of liquid past said lower rollers preventing reabsortion in the crushed billets, and materially reducing the weight of the rollers.

6. A crushing means as described in claim 4 wherein said crushing conveyor chain pulleys are square, and said endless chain comprises links coinciding in length and width with the sides of said square pulley and are transversely and sequentially hinged, said hinged parts extending beyond said pulley sides.

7. An endless chain as described in claim 6 wherein said links are longitudinally scored on their respective upper surfaces for draining the liquid crushed from the stalks from after-crushing contact therewith.

References Cited
UNITED STATES PATENTS

| | | | |
|---|---|---|---|
| 639,691 | 12/1899 | Williams | 171—127 X |
| 301,198 | 7/1884 | Yaryan. | |
| 965,486 | 7/1910 | Putt | 100—153 X |
| 1,218,559 | 3/1917 | Hullinger | 100—153 |
| 1,908,966 | 5/1933 | Falkiner et al. | 56—17 |
| 1,975,089 | 10/1934 | Falkiner et al. | 56—17 |
| 1,990,172 | 2/1935 | Falkiner et al. | 56—17 X |
| 2,244,209 | 6/1941 | Moss | 100—100 |
| 2,912,811 | 11/1959 | Van Buskirk | 56—15 |

ANTONIO F. GUIDA, *Primary Examiner.*